United States Patent [19]
Florent et al.

[11] Patent Number: 6,154,519
[45] Date of Patent: Nov. 28, 2000

[54] IMAGE PROCESSING METHOD FOR MOTION ESTIMATION IN A SEQUENCE OF IMAGES, NOISE FILTERING METHOD AND MEDICAL IMAGING APPARATUS UTILIZING SUCH METHODS

[75] Inventors: Raoul Florent, Valenton; Philippe Gatepin, Paris, both of France

[73] Assignee: U.S. Philips Corporation, New York, N.Y.

[21] Appl. No.: 09/249,967

[22] Filed: Feb. 12, 1999

[30] Foreign Application Priority Data

Feb. 17, 1998 [FR] France .................................. 98 01906

[51] Int. Cl.[7] .................................................. G01N 23/04
[52] U.S. Cl. .............................................. 378/62; 378/98
[58] Field of Search ................................ 378/4, 62, 98, 378/98.2

[56] References Cited

U.S. PATENT DOCUMENTS

| | | | |
|---|---|---|---|
| 5,337,231 | 8/1994 | Nowak et al. ...................... | 364/413.24 |
| 5,473,384 | 12/1995 | Jayant et al. ............................. | 348/470 |
| 5,717,463 | 2/1998 | Brailean et al. ........................ | 348/416 |
| 5,790,686 | 8/1998 | Koc et al. ................................ | 382/107 |

FOREIGN PATENT DOCUMENTS

| | | |
|---|---|---|
| 0751482A1 | 1/1997 | European Pat. Off. . |
| 0751483A1 | 1/1997 | European Pat. Off. . |
| 0780795 | 6/1997 | European Pat. Off. . |
| 0780795A1 | 6/1997 | European Pat. Off. . |
| WO9507591 | 3/1995 | WIPO . |

OTHER PUBLICATIONS

"A Reference Data Oriented Approach for Implementing a Multiresolution Block–Matching Algorithm" International Symposium on Circuits and Systems (ISCAS), Atlanta, May 12–15, 1996, vol. 4, 12 maj 1996, pp. 249–252,.

"A Reference Data Oriented Approach for Implementing a Multiresolution Block–Matching Algorithm" by Yazid Nemouch et al., in IEEE, (May 12, 1996) pp. 249–252.

"Robust Block–Matching Motion–Estimation Technique for Noisy Sources" by Robert M. Armitano et al. In "1997 IEEE, International Conference on Acoustics, Speech and Signal Processing", vol. IV< pp. 2685–2688.

*Primary Examiner*—David V. Bruce
*Attorney, Agent, or Firm*—Dwight H. Renfrew

[57] ABSTRACT

The invention relates to an image processing method for estimation of motion in a sequence of temporal images on the basis of a block matching algorithm, which method includes the steps of: acquiring a sequence of three successive temporal images, including an image to be processed ($J_t$) between a preceding, so-called causal image ($J_{t-1}$) and a later, so-called anti-causal image ($J_{t+1}$), determining a reference block ($RB_t$) in the image to be processed, and of a pair of blocks ($CB_{t-1}$, $CB_{t+1}$) which are located in the causal image and the anti-causal image, respectively, and best match the reference block ($RB_t$) in conformity with an intensity similarity criterion, and determining a motion vector relating to the reference block on the basis of the location of the blocks of the pair with respect to the location of the reference block. The invention also relates to an image processing method for reducing the noise in a sequence of images, including steps for evaluating motion vectors between the images of the sequence and steps for the recursive temporal filtering of the noise with motion compensation by means of the vectors, and to an X-ray apparatus which includes a system for the acquisition of a sequence of images and an image processing system which has access to the data of the images and to a system for displaying the images of the sequence, and includes a processor for carrying out an image processing method.

18 Claims, 5 Drawing Sheets

FIG. 7D

IMAGE PROCESSING METHOD FOR MOTION ESTIMATION IN A SEQUENCE OF IMAGES, NOISE FILTERING METHOD AND MEDICAL IMAGING APPARATUS UTILIZING SUCH METHODS

FIELD OF THE INVENTION

The invention relates to an image processing method for estimating the motion of objects reproduced in a sequence of noisy images, as well as to a noise filtering method which includes such a motion estimation method.

The invention also relates to a medical imaging apparatus for carrying out the motion estimation method and/or the noise filtering method, notably an X-ray apparatus. In a specific application said X-ray apparatus operates in the fluoroscopy mode in order to visualize the vascular system.

BACKGROUND OF THE INVENTION

An image processing method for estimating the motion of objects in a sequence of noisy images is already known from the publication "ROBUST BLOCK-MATCHING MOTION-ESTIMATION TECHNIQUE FOR NOISY SOURCES" by ROBERT M. ARMITANO et al. in "1997 IEEE, International Conference on Acoustics, Speech and Signal Processing", Vol. IV, pp. 2685–2688.

In order to carry out the method described in the cited publication, a sequence of images is acquired until an instant t. The image treated at the instant t is the last image arriving. It is divided into adjoining blocks which are denoted by their co-ordinates; a current block from among said blocks is examined. A block having the same co-ordinates is determined in the preceding image, occurring at the instant t−1, and a search window whose dimensions are linked to the presumed amplitude of the motion is formed around this block. This method, being based on a so-called Block Matching Algorithm (B.M.A.), aims to determine, in the search window, a so-called matching block which matches the current block and is that block which, in conformity with a predetermined intensity similarity criterion, has luminosity properties which are nearest to those of the current block. The determination of the matching block yields a motion vector which measures the spatial translation between the current block in the image at the instant t and the matching block in the preceding image of the instant t−1.

This motion estimation method includes an estimation of a coarse motion vector in order to provide an approximate location of the matching block, followed by the application of an intensity similarity criterion in order to estimate a real motion vector around the coarse motion vector. The similarity criterion is not described.

The estimation of the coarse motion vector includes the determination of a plurality of p motion vectors relating to matching blocks situated in respective ones of an identical number of p successive temporal images which precede the image which is processed at the instant t and contains the current block, and a linear temporal filtering operation which yields said coarse motion vector as a weighted mean value of p preceding motion vectors. Such linear temporal filtering of p preceding motion vectors is of the predictive type, which means that, p preceding motion vectors relating to p matching blocks in the preceding images being known, the coarse motion vector between the instants t and t−1 is predicted on the basis of a specific hypothesis that the motion estimated over the p preceding, successive matching blocks is strictly linear and continuous. The similarity criterion is then locally applied around the coarse vector in order to estimate the real motion vector.

Because of the fact that the above method implies such a prediction step, it loses its effectiveness whenever a new motion appears, because in that case the coarse motion vector cannot be determined since the p preceding motion vectors do not exist. Therefore, the real vector, based on the coarse vector, can no longer be found locally.

SUMMARY OF THE INVENTION

A problem mentioned in the cited publication is that the motion estimation method has difficulty in tracking objects in motion in the sequence of images when the images are noisy beyond a given level, notably because such a method utilizes the Block Matching Algorithm (B.M.A.) in a plurality of prior images. In such a sequence the objects appear to change from one image to the next because of the noise and not necessarily as the result of the motion. Moreover, this method requires an enormous amount of calculation time.

A further problem consists in that, as will be known to those skilled in the art, the best methods for the reduction of noise in a sequence of images are the recursive temporal noise filtering methods. However, these recursive temporal noise filtering methods do not perform well in the case of motion. Generally speaking, the only solution enabling the use of such temporal recursive filters in the case of motion is to decrease their noise suppression factor by a substantial amount; this leads to detrimental effects, such as noise breakthroughs or blurring, to such an extent that the temporal filter is liable to erase the small objects or the small details of the object in motion.

It is an object of the invention to provide a motion estimation method which serves in particular to assist a temporal filter, or spatial temporal filter, in achieving effective noise suppression in the case of motion.

This object is achieved and the described problems are solved by means of an image processing method for estimation of motion in a sequence of noisy images which includes a step for determining a motion vector field from one temporal image to the next on the basis of a block matching algorithm, which method includes the steps of acquiring a sequence of three successive temporal images, including an image to be processed ($J_t$) between a preceding, so-called causal image ($J_{t-1}$) and a later, so-called anti-causal image ($J_{t+1}$), of determining a reference block ($RB_t$) in the image to be processed, and a pair of blocks ($CB_{t-1}$, $CB_{t+1}$) which are located in the causal image and the anti-causal image, respectively, and best match the reference block ($RB_t$) in conformity with an intensity similarity criterion, and of determining a motion vector relating to the reference block on the basis of the location of the blocks of said pair with respect to the location of the reference block.

An image processing method for the reduction of the noise in a sequence of images involves an arrangement for recursive temporal filtering and such a motion estimation method.

A medical imaging apparatus includes a system for the acquisition of a sequence of images and an image processing system which has access to the data of the images and to a system for the display of the images of the sequence and includes a processor for executing such an image processing method for noise reduction.

BRIEF DESCRIPTION OF THE DRAWINGS

The invention will be described in detail hereinafter with reference to the accompanying diagrammatic drawings; therein.

DESCRIPTION OF THE PREFERRED EMBODIMENTS

The invention relates to a method of processing a sequence of noisy images which reproduce objects with motions which occur in a zone which is quite large in relation to the size of an image, or have a high amplitude from one image to the next. A high amplitude is to be understood to mean motions of the order of 10 pixels or more. This method involves the steps represented by the functional blocks of FIG. 1.

One possible field of application is the reduction of the noise in video images, notably images to be encoded, since the encoding of noisy images is costly. Another field of application is the reduction of noise in medical images, notably the images produced by radiological X-ray apparatus operating in the fluoroscopy mode. At a rate of from 3 to 25 images per second these apparatus supply sequences of images which are very noisy because of the fact that they have been formed while utilizing very low X-ray doses. Such sequences of fluoroscopic images are frequently used to track surgical operations on-line and hence the noise must be suppressed in real time. Moreover, these sequences of images contain very small objects in motion, such as a catheter, which may not be erased by the image processing operations. Small details or small objects are to be understood to mean herein objects having a diameter of the order of 10 pixels or less.

Figure 4:
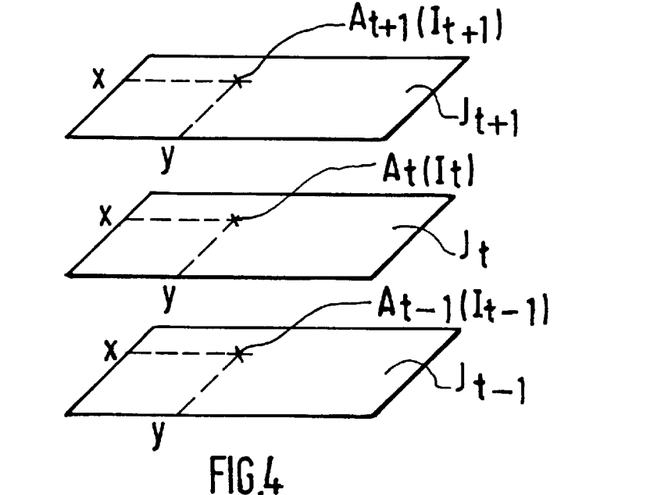
FIG. 4 illustrates the acquisition of a sequence of three temporal images.

The motion estimation method includes a step 10 for the acquisition and digitization of a sequence of images which includes an image $J_t$ to be processed, a preceding, so-called causal image $J_{t-1}$ and a subsequent, so-called anti-causal image $J_{t+1}$. Referring to FIG. 4, each noisy digitized image $J_t, J_{t-1}, J_{t+1}$ consists of a two-dimensional spatial matrix of pixels which are denoted by the co-ordinates x, y which are represented as $A_t, A_{t-1}, A_{t+1}$ in the three temporal images and have a digitized intensity level $I_t(x,y), I_{t-1}(x,y), I_{t+1}(x,y)$, respectively. For the sake of simplicity, the intensities are denoted directly as $I_t, I_{t-1}, I_{t+1}$.

Figure 7A:
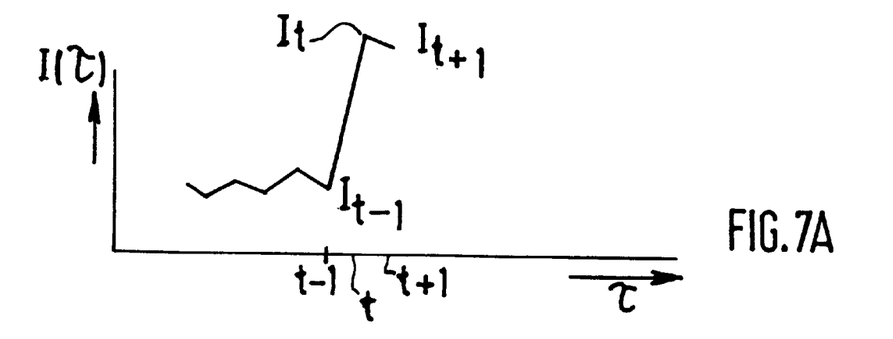
FIGS. 7A, 7B, 7C, 7D show a noisy temporal signal with motion, a noisy temporal signal with a noise peak, a noise-filtered temporal signal with motion, and a motion-compensated and noise-filtered temporal signal, respectively.
Figure 7B:
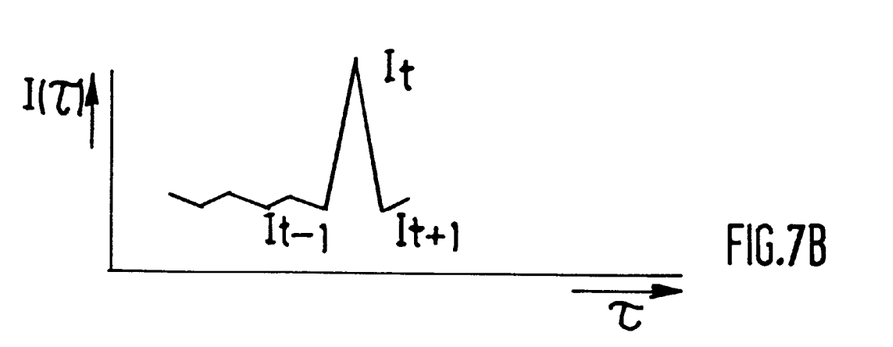
Figure 7C:
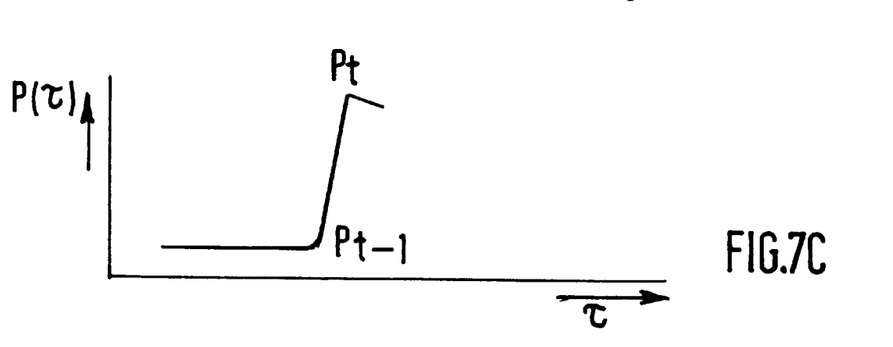
Figure 7D:
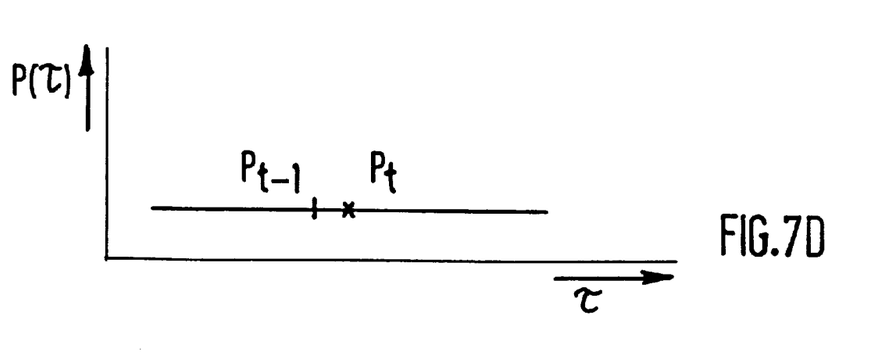

Referring to the FIGS. 7A and 7B, a recursive temporal noise filtering method which is suitable for successively reducing the noise of each image in a sequence of images includes the processing of a so-called noisy temporal signal which is formed by different intensity levels $I_{t-1}, I_t, I_{t+1}$ of the pixels $A_{t-1}, A_t, A_{t+1}$, localized in x, y, as a function of time ($\tau$). Referring to FIG. 7A, the temporal signal comprises a leading intensity edge between the instants t−1 and t, and a plateau beyond t, at the instant t+1, which is characteristic of a motion between the instants t−1 and t+1 in the case of a simple noisy signal. Referring to FIG. 7B, the temporal signal exhibits a noise peak at the instant t, between the instants t−1 and t+1, so a signal which is simply completely noisy. In FIG. 7C a temporal filtering method has been applied to the signal of FIG. 7A so as to obtain a filtered temporal signal $P(\tau)$ by recursive temporal filtering without motion compensation. As a result, the intensities remain shifted to both sides of the ascending edge due to the motion. FIG. 7D shows the same temporal noise-filtered signal in which the ascending edge no longer exists, meaning that the motion has also been compensated. The present method enables motion estimation in order to compensate it so as to obtain the result shown in FIG. 7D.

The temporal intensities $I_{t-1}, I_t, I_{t+1}$, being the points of the temporal signal, are called samples. The samples preceding and succeeding the sample $I_t$ being treated are called the causal sample and the anti-causal sample, respectively, and are denoted by the references $I_{t-1}$ and $I_{t+1}$. A recursive temporal filtering method performs a calculation of a general function such as the following:

$$P_t = P_{t-1} + K_t(I_t - P_{t-1}) \tag{1}$$

where $K_t$ is a noise suppression factor which may be adapted so as to ensure that the recursive temporal filtering operation treats the small local motions and the noise peaks as disclosed in the European patent applications EP-0751482 or EP-0751483. The method described in said applications enable filtering of the noise, the noise peaks and the noise trails.

As will be known to those skilled in the art, recursive temporal filtering is one of the best methods for the suppression of noise in images. However, this type of filtering is not capable of correctly filtering the image in case a motion of high amplitude occurs. A solution nevertheless enabling the use of recursive temporal filtering in the case of motion consists in carrying out an image processing method which includes a first phase for motion estimation and a second phase for recursive temporal filtering. These two phases can be combined according to different schemes.

According to a first scheme (see FIG. 3A), the noisy signal $I_t$ of the image $J_t$ to be processed is subjected to a first phase 150 in which an estimation as well as a compensation of the motions relating to the image $J_t$ being processed are performed. This first phase yields a registered signal $C_t$. The registered signal $C_t$ is subsequently subjected to a second phase 250 which performs the recursive temporal filtering and supplies the noise-suppressed signal $P_t$.

According to a second scheme (see FIG. 3B), the noisy signal $I_t$ of the image $J_t$ to be processed is subjected to a first phase 100 which executes exclusively a motion estimation and supplies a motion vector $V_t$ relating to the location x, y. The noisy signal $I_t$ and the motion vector $V_t$ are subsequently subjected to a second phase 200 which performs the temporal filtering of the signal $I_t$, aided by the motion vector $V_t$, in order to compensate the motion and to produce the noise-suppressed signal $P_t$ to be assigned to the current pixel so as to form a noise-suppressed image.

Figure 3A:
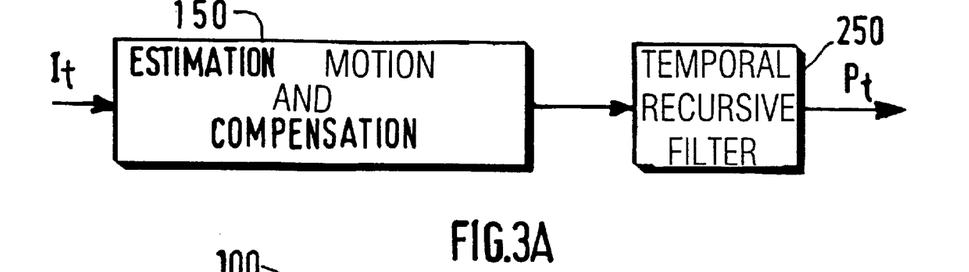
FIGS. 3A and 3B show two arrangements for a motion estimation procedure and a temporal noise filtering method.
Figure 3B:
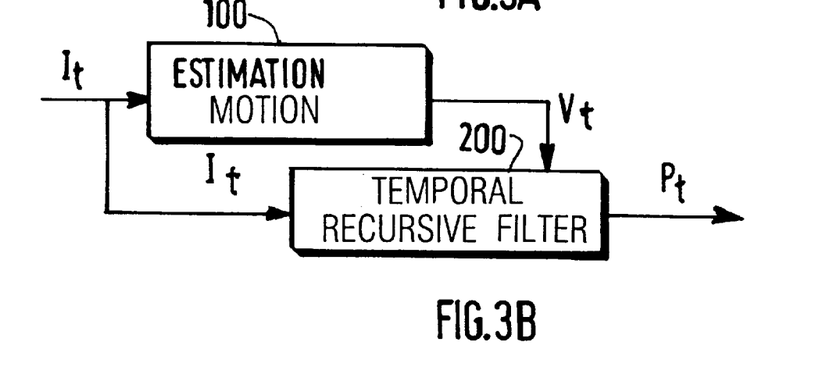

These two schemes aim at to achieve the same result. In practice the first scheme of FIG. 3A is used more often: the temporal filter receives the intensities $I_t$ of the images as well as a motion vector field $V_t$ and utilizes the motion vector field so as to compensate the motion in the image while filtering it.

Therefore, it is an object of the invention to provide a method of estimating motion in order to implement the first phase of the schemes presented above. The motion estimation is a method which itself serves to suppress noise in images so as to be combined with a second, temporal filtering phase for effective noise suppression in the case of motion. Numerous methods are already known for the estimation of motion, but these methods generally apply to images which are not very noisy so that the results are inacceptable when they are applied to very noisy images.

Figure 1:
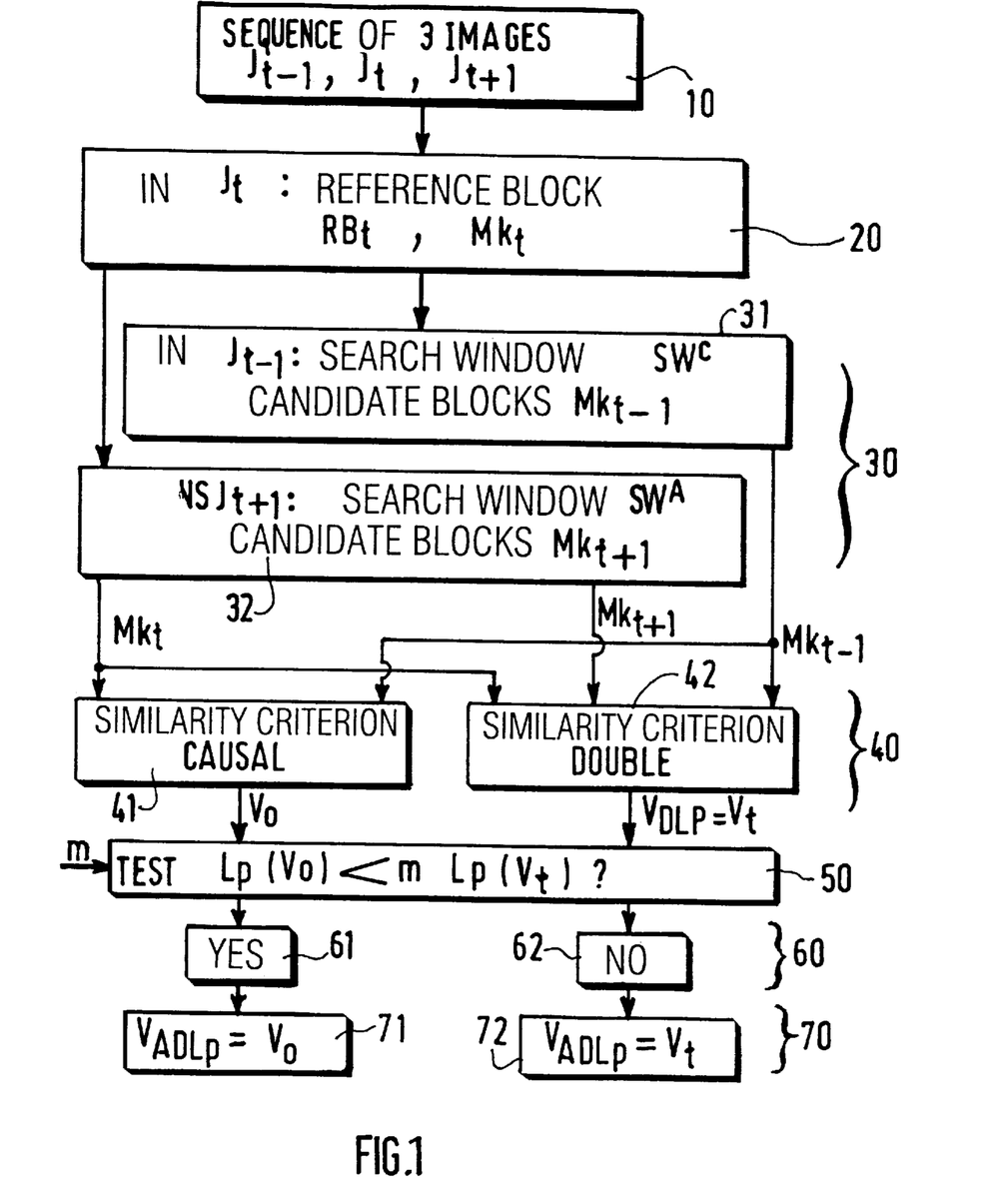
FIG. 1 shows functional blocks representing the steps of the motion estimation method.
Figure 5A:
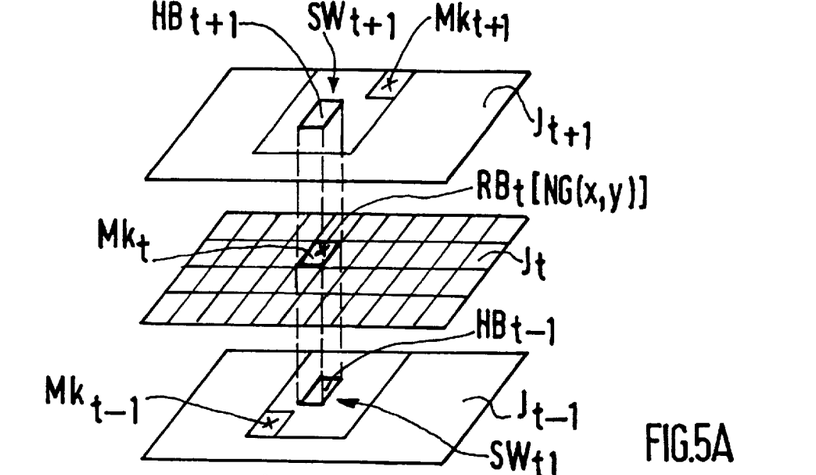
FIG. 5A illustrates the determination of two search windows and FIG. 5B illustrates the determination of two motion vectors in a sequence of three images.

Referring to the FIGS. 1 and 5A, the present method of motion estimation includes a preliminary step 20 in which the image $J_t$ to be processed is sub-divided into adjoining blocks of, for example 12×12 or 16×16 pixels. The image $J_t$ is thus divided into elementary blocks which are referred to as reference blocks $RB_t$. The reference blocks are treated one after the other by means of a completely automatic scanning method which is known to those skilled in the art, for example from left to right and from the top to the bottom of the image. For the description of the present method a current block will be considered, being a reference block chosen in a given position in the image $J_t$ to be processed. Each reference block of the image J, is defined by a reference point $M_k$ which is situated, for example at the center of the block. The reference point is always considered in the same neighbourhood in each block and is characterized by its co-ordinates x, y, as in FIG. 4. In the image $J_t$ the reference block itself constitutes a neighbourhood NG(x,y) of the reference point $M_k$.

The present motion estimation method, in this case called FA-BMA, subsequently includes two important steps, being:

- a step 30 for applying a specific search policy SP which defines, on the basis of a given reference block in the image to be processed, candidate blocks in a respective search window in the images, being the causal and the anti-causal image, in the sub-steps 31 and 32;
- a step 40 for applying a double intensity similarity criterion DCS, enabling selection of two matching blocks from among the candidate blocks in the causal and the anti-causal image, and calculation of two symmetrical motion vectors from the reference block towards each of the matching blocks; on the basis thereof a motion vector to be assigned to the reference block is derived.

Thus, the present motion estimation method FA-BMA includes the matching of three blocks in three temporal images, being the image $J_t$ to be processed, the causal image $J_{t-1}$ and the anti-causal image $J_{t+1}$. It is to be noted that the motion estimation algorithm BMA (Block Matching Algorithm) already known from the state of the art performs the matching of only two blocks in two respective temporal images, being only the image to be processed and the causal image. The search policy step, therefore, uses not just two successive images as is known already, but a trio of images which is formed by the causal image $J_{t-1}$, the image to be processed $J_t$ and a supplementary image, being the anti-causal image $J_{t+1}$.

Referring to FIG. 5A, the step 30 for applying the specific search policy SP includes on the one hand, for a given reference block $RB_t$, a sub-step 31 for determining a homologous block $HB_{t-1}$ in the causal image $J_{t-1}$ which has the same location x, y as the reference block $RB_t$ and for defining, around said homologous block $HB_{t-1}$, a search window $SW_{t-1}$ in which a given number of so-called candidate blocks is defined.

The step 30 for applying the specific search policy SP on the other hand includes, for the same reference block $RB_t$, a sub-step 32 for determining an anti-causal homologous block $HB_{t+1}$ in the anti-causal image $J_{t+1}$, and for defining a search window $SW_{t+1}$ around the anti-causal homologous block in which candidate blocks are defined by means of the same process.

The search windows $SW_{t-1}$, $SW_{t+1}$, are defined by way of their width, thus defining the maximum modulus of the motion vectors that can be found between the instants t and t−1 on the one hand and between t and t+1 on the other hand. The vector stops at the boundaries of the search window which is thus determined in conformity with the maximum motions expected or to be compensated in the image.

The step 40, 42 for applying the double intensity similarity criterion DSC includes on the one hand a comparison between the candidate blocks of the causal image $J_{t-1}$ and the reference block $RB_t$ and on the other hand a comparison between the candidate blocks of the anti-causal image $J_{t+1}$ and the same reference block $RB_t$, using the same double intensity similarity criterion applied to this anti-causal image instead of the causal image. The candidate blocks which best resemble the reference block $RB_t$ according to this double intensity similarity criterion are chosen as the matching blocks and are called $CB_{t-1}$ and $CB_{t+1}$, respectively, in order to define a first motion vector V(t,t−1) between the instant t and the instant t−1 in the location x, y, and to define a second motion vector V(t,t+1) between the instants t and t+1 in the same location x, y. The first motion vector V(t,t−1) spatially links the center $MK_t$ of the reference block $RB_t$ to the center $MK_{t-1}$ of the matching block $CB_{t-1}$ and is oriented from the reference block $RB_t$ in the image $J_t$ towards the homologous block $HB_{t-1}$. The second motion vector V(t,t+1) spatially links the center $MK_t$ of the reference block $RB_t$ to the center $MK_{+1}$ of the matching block $CB_{t+1}$ and is oriented from the reference block $RB_t$ in the image $J_t$ towards the anti-causal homologous block $HB_{t+1}$.

Figure 5B:
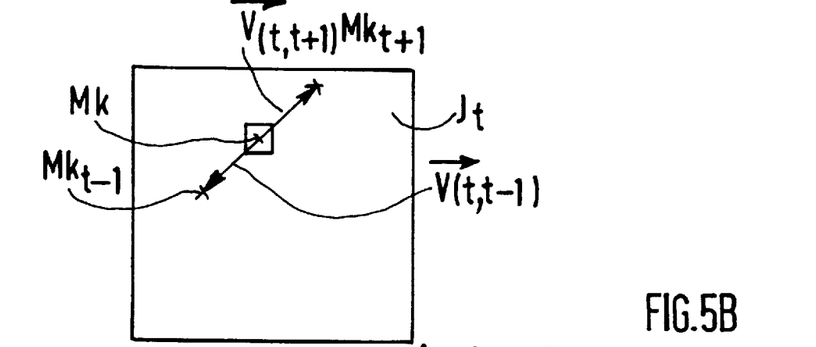

The novel double similarity criterion D-SC is based on a hypothesis that the motion between the matching block in the image t−1 and the reference block in the image t on the one hand and between the reference block in the image t and the matching block in the image t+1 is locally linear, continuous and uniform. This means that the motion vector between t−1 and t is the same as that between t and t+1. Thus, the vector V(t−1,t) is the same as the vector V(t,t+1), it has the same modulus and the same orientation. Referring to FIG. 5B, these vectors are supported by the same supports and are represented by arrows which diverge as from the reference block $RB_t$; this is expressed by the equality:

$$V(t,t-1)=-V(t,t+1) \qquad (2)$$

Thus, a first matching block $CB_{t-1}$ is determined in the image $J_{t-1}$ and a matching block $CB_{t+1}$ is determined in the image $J_{t+1}$, subject to the restriction that these two matching blocks must be symmetrical with respect to the reference block $RB_t$ in the image $J_t$.

In order to determine these symmetrical vectors, there is defined an elementary similarity criterion which forms a first, so-called causal part of the double similarity criterion, is applied between the first matching block $CB_{t-1}$ in the search window $SW_{t-1}$ and the reference block $RB_t$ in the image $J_t$ and is written as:

$$SC^C(Mk_t, Mk_{t-1}+V) \qquad (3a).$$

Similarly, there is defined an elementary similarity criterion which forms a second, so-called anti-causal part of the double similarity criterion, is applied between the second matching block in the search window $SW_{t+1}$ and the reference block $RB_t$ in the image $J_t$ and is written as:

$$SC^A(Mk_t, Mk_{t+1}+V) \quad (3b).$$

The point Mk+a vector define another translated point of the point Mk by said vector. Taking into account samples of the temporal signal, the causal and anti-causal parts of the double similarity criterion are written as:

$$SC^C = \Sigma[I_t(X_k, Y_k) - I_{t-1}(X_k+V_x, Y_k+V_y)]^2 \quad (4a)$$

$$SC^A = \Sigma[I_t(X_k, Y_k) - I_{t+1}(X_k+V_x, Y_k-V_y)]^2 \quad (4b)$$

$$(X_k, Y_k) \in NG_k \quad (5a).$$

The causal and anti-causal parts of the double criterion as written above represent the Eucledian distance between the reference block and the candidate block in the causal image and in the anti-causal image, respectively, i.e. the sum of the squares of the differences of the intensities of two pixels, one of which is situated in the reference block whereas the other is situated in the candidate block in the causal image corresponding to the vector V(t,t−1) and in the candidate block of the anti-causal image which corresponds to the vector V(t,t+1).

More precisely, a vector V is defined by its two components $V_x$ and $V_y$. For each location x, y there is a pixel in the reference block and a matching pixel in the candidate block. The intensity differences between the two pixels are calculated, raised to the square and the assembly is summed. This constitutes an enormous amount of calculation work. The causal part $SC^C$ of the similarity criterion is calculated for each candidate block and the block offering the best similarity measure is chosen in order to determine the motion vector. Thus, the number of squared differences which must be calculated in order to evaluate the similarity criterion is equal to the number of pixels present in the block: a block of 8×8 pixels thus implies a sum of 64 elements. The pixels are taken two by two, i.e. 1 in each block, separated by the same vector V. A vector V is defined for each candidate block. In a reference block all pixels are deemed to have the same motion vector. This means that the FA-BMA method is based on a translation motion which links two blocks and that $V_x$ and $V_y$ do not vary for a given candidate block. If a block of 8×8 pixels is defined and if a search window SW with more or less 10 or 15 pixels is defined around the homologous block, there are 10 or 15 possible positions for each side of the block in x and in y. This signifies that the object can move through more or less 10 or 15 pixels. Thus, the search window is dimensioned 28×28 pixels or 33×33 pixels. This means that for each candidate block 64 differences must be raised to the square and summed for a single similarity measurement. This is the same for the estimation of the motion vector by means of the second, anti-causal part $SC^A$ of the intensity similarity criterion.

Use is preferably made of an exhaustive specific search policy F-SP; according to this policy all possible blocks of the search window are chosen, i.e. all blocks referenced by their reference point, for example being the central pixel, and by their dimensions. Each point of the search window thus is a reference point for a candidate block. In this case, in order to evaluate the first causal criterion $SC^C$ it is necessary to test all possible candidate blocks in the search window, in this case being 28×28 pixels or 33×33 pixels, so that 784 or 1089 similarity measurements must be carried out. In total this makes for 784×64 or 1089×64 squared differences. The same is done for the evaluation of the second, anti-causal similarity criterion $SC^A$. Thus, the calculation of the similarity measurements by means of this exhaustive search policy F-SP utilizes very large calculation capacities which are necessary for making the motion estimation.

Thus, the double intensity similarity criterion D-SC is novel because of the fact that it combines a causal part and an anti-causal part, being the same elementary similarity criterion applied at different instants. Thus, the double criterion D-SC can be written as:

$$D\text{-}SC = SC^C[Mk_t, Mk_{t-1}+V] + SC^A[Mk_t, Mk_{t+1}-V] \quad (6)$$

According to the formule (6), the causal part and the anti-causal part are evaluated by summing so as to form the double intensity similarity criterion which is called the causal/anti-causal criterion.

The motion vector searched is that which minimizes the double similarity criterion over all candidate blocks defined in the search windows $SW_{t+1}$ and $SW_{t-1}$ in the images $J_{t+1}$ and $J_{t-1}$.

In order to evaluate the causal/anti-causal double similarity criterion D-SC, use can be made of the previously defined Eucledian distance. On the other hand, use can be made of a sum of absolute values of the intensity differences. Generally speaking, the causal/anti-causal similarity criterion is a function or a combination of two causal and anti-causal parts of an intensity similarity criterion.

The reference L2 hereinafter denotes the Eucledian distance or standard and L1 denotes the sum of the absolute values of the intensity differences. Depending on whether one standard or the other is used to form the parts of the similarity criterion, the causal/anti-causal similarity criterion is written either as $D\text{-}SC_{DL2}$ or $D\text{-}SC_{DL1}$. Generally speaking, use can be made of distances such as: $[\Sigma[I_t-I_{t-1}]^P]^{1/P}$, where $[\Sigma[I_t-I_{t+1}]^P]^{1/P}$ is the so-called Minkowski distance. Hereinafter, Lp denotes the distance used for evaluating the causal and anti-causal parts of the double similarity criterion which is now called $DSC_{DLp}$.

The test shows that this novel double criterion $D\text{-}SC_{DLp}$ offers very good results when the motion is linear because when a matching causal block having a vector V is found, the matching anti-causal block will necessarily have a vector −V. Thus, instead of using the information from two blocks only, i.e. from the reference block and from the causal block as in the prior art, use is made of information which is extracted from three blocks: the causal block, the reference block and the anti-causal block. The motion estimation method is thus much more resistant to the noise because advantage is taken of more information. This actually comes down to acting on the similarity measure.

However, if the motion is not linear over the three images, the method described above cannot be applied. This is not a very frequent case. Actually, when using a rate of 25 images per second, two images are spaced ¹⁄₂₅ second apart. Consequently, at this rate the motion between three consecutive images may be considered to be linear and continuous over three temporal images.

Nevertheless, referring to FIG. 1, in order to take into account the eventuality of occurrence of a non-linear motion between the instants t-1 and t+1, the present method includes a sub-step 41 which is carried out in parallel with the sub-step 42 in the step 40, thus forming two chains 41, 42 which are terminated by a test step 50 which is applied in this case.

Let $V_0$ be the vector determined by an elementary similarity criterion applied between the single reference and causal blocks, and let $V_{DLp}$ be the vector determined by the exhaustive double causal/anti-causal criterion. The vector $V_{DLp}$ is less good than the vector $V_0$ in the case of a non-linear, non-continuous, non-uniform motion, because the vector $V_0$ is the best in the search window between the images $J_t$ and $J_{t-1}$. Due to this non-continuity, the vector $V_{DLp}$ may be completely different from the real motion vector, so that the distance:

$$Lp(V_0) < m \times LP(V_{DLp}) \qquad (7)$$

In the formula (7) the factor m must be concise. For example, if $LP(V_0)$ is more than 20% smaller than $LP(V_{DLp})$, the continuous linear hypothesis is probably not true and that the vector $V_0$ is the best vector searched. Therefore, m in the formula (7) is equivalent to 0.8 in order to correspond to 20%.

In the chain 41, with TEST 50, if the relation (7) is verified, a non-linear or non-continuous or non-uniform motion is detected and hence a decision 61 is taken, implying that the motion vector chosen is:

$$V_{ADLP} = V_0$$

If the relation (7) is not verified, so that the motion detected between the three images is linear, continuous and uniform, another decision 62 is taken and the motion vector chosen is:

$$V_{ADLP} = V_{DLP},$$

where ADLp signifies Adaptive DLp. The similarity criterion of FIG. 1, therefore, is a double and adaptive intensity similarity criterion called AD-$SC_{DLp}$.

On the one hand, in the case where the present method can be based on the hypothesis of linearity, as has been explained above, it is much more robust to noise than the known method. On the other hand, the present method enables testing of the linearity hypothesis and if it appears that this linearity hypothesis is not true, it offers the solution which is locally acceptable. The use of the double and adaptive criterion AD-$SC_{DLp}$ offers remarkable results in practice, the more so since the hypothesis of linearity between three temporal images is only rarely not true.

Thus, in the so-called motion estimation method FA-BMA, the double and adaptive intensity similarity criterion AD-$SC_{DLp}$ is based on the information of three temporal blocks and is constituted by a function of a causal part of the criterion and an anti-causal part of the criterion. This method enables notably a test to be executed on the causal part of this function and, at the end of this test, a conclusion to be drawn whether the linearity hypothesis is true or not. This verification is performed on each block. Generally speaking, the calculation applied to the causal part of the criterion is performed first, thus supplying the vector which minimizes the causal part of the criterion so that this test is carried out once for each reference block.

This double and adaptive similarity criterion introduces a notion of temporal coherence, i.e. the vector field found in a temporal manner should verify a linearity hypothesis, thus imposing a restriction on the vector searched. In the temporal filtering phase, instead of filtering along the conventional temporal axis, the application of this motion vector enables filtering in the direction of motion. The temporal filtering is thus applied between the blocks which resemble one another instead of being performed between blocks which are dissimilar due to the motion.

Preferably, use is made of the exhaustive search policy F-SP whereby all reference blocks in the image $J_t$ are considered, after which for each reference block all possible blocks are analyzed in the search window of the causal image and at the same time also in the search window of the anti-causal image. This means a considerable number of calculations. The method is in this case implemented by combining a large number of processors or by means of a dedicated chip.

Hereinafter it is proposed to utilize a specific search policy HF-SP which enables a reduction of the calculations and is fully adapted to the execution of the motion estimation method in real time. This search policy will be referred to hereinafter as a hierarchical search. Combining this hierarchical search policy HF-SP with an adaptive double causal/anti-causal similarity criterion AD-$SC_{DLp}$ completely defines a novel motion estimation method.

Figure 2:
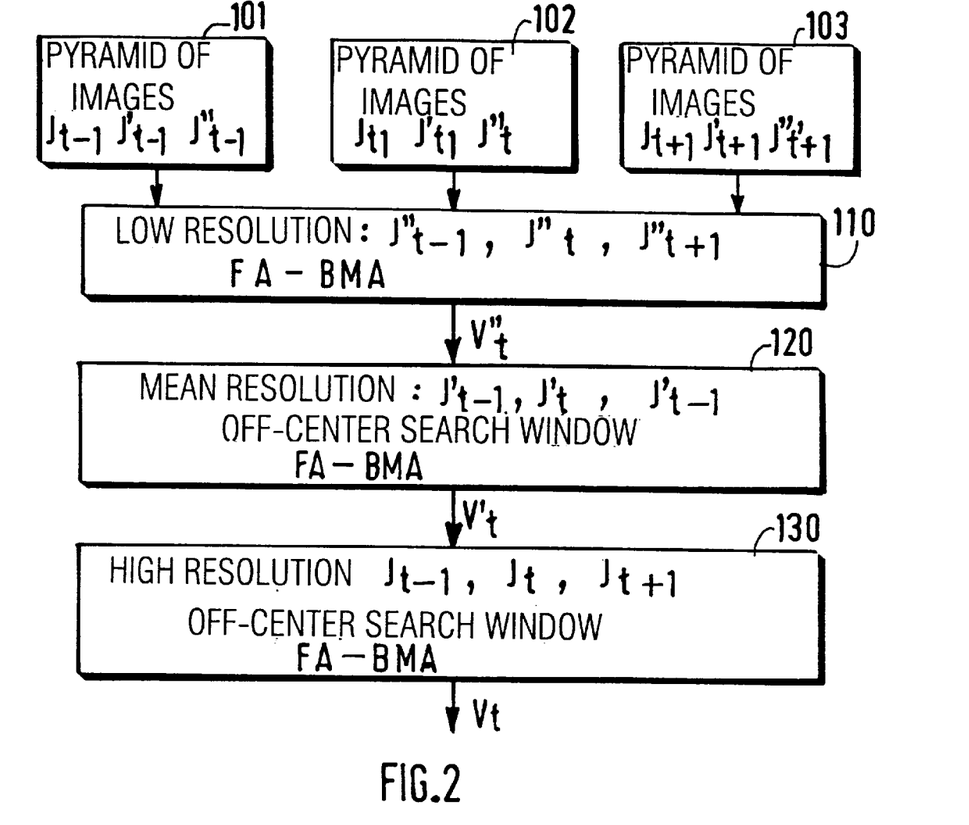
FIG. 2 shows functional blocks representing the steps of an alternative version of the method of FIG. 1.

Referring to FIG. 2, according to the hierarchical method the original image is decomposed in a step 101 by subjecting it to filtering and sub-sampling operations. The original image $J_t$ is subjected to a method which is known from the state of the art so as to associate 1 pixel with a neighborhood of pixels of the original image and an intensity which is calculated as the mean intensity of the neighborhood is assigned to this pixel. In the example described hereinafter, the neighborhood consists of 4 pixels around a pixel considered. The mean value is calculated over the four pixels. Thus, an image is formed which is decomposed into a first level called $J'_t$. Subsequently, the pixels of the image $J'_t$ of the first level are regrouped so as to form a smaller image at a second level called $J''_t$. Thus, a pyramid of images is formed from the image $J_t$ with the original resolution; the image $J'_t$ at a first level has an intermediate resolution and the image $J''_t$ at a second level has a coarse resolution. At the latter resolution, being the coarsest, there is an image which contains all important details which were present in the original image. Small nuances, small details have been lost, but the large tendencies of the image have been preserved. It is to be noted that this coarse image $J''_t$ is not a noise filtered image, so that the loss of details is not important at this stage.

Figure 6:
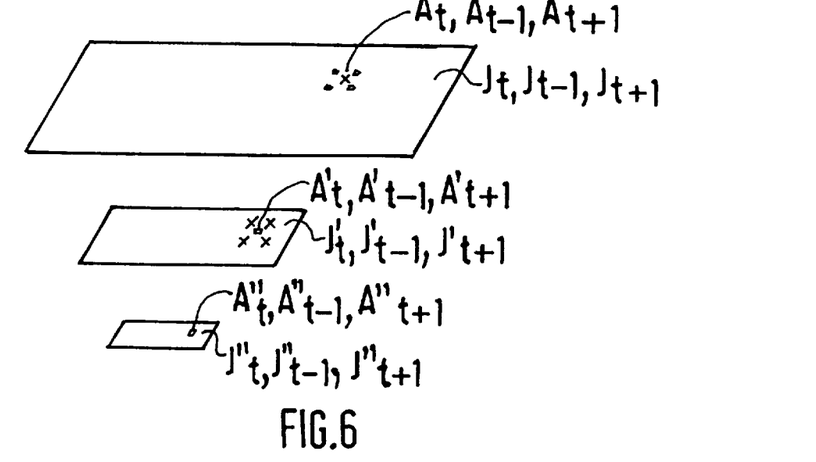
FIG. 6 illustrates the decomposition of the three images of the image sequence into three levels each so as to form three image pyramids.

Referring to the FIGS. 1 and 6, this pyramid of images is formed for the image $J_t$ in the step 101, for the causal image $J_{t-1}$, in the step 102, yielding $J'_{t-1}$, $J''_{t-1}$, and for the anti-causal image $J_{t+1}$ in the step 103, yielding $J'_{t+1}$, $J''_{t+1}$. Subsequently, in the steps 110, 120, 130 the novel method according to the invention, called FA-BMA above, is applied between the images to be processed and the causal and anti-causal images having the same resolution. Because of this dilatation effect, the number of calculations involved in the search for the motion vectors is no longer proportional to the magnitude of the motion vector to be detected, but to this magnitude divided by two to the power n, where n is the number of decomposition levels. Thus, in the case of two decomposition levels with respect to the normal resolution the number of calculations is divided by four.

The operations are executed as follows. First of all, in the step 110 a motion vector $V''_t$ is determined by means of three images having the coarsest resolution. Subsequently, in the step 120 a vector $V'_t$ having the intermediate resolution is searched: this means that the magnitude of the vector $V''_t$ found at the coarsest resolution is multiplied by two and the search windows are determined in the intermediate causal and anti-causal images, be it not around the location of the reference point but around the extremity of this most probable vector determined by means of the images having the coarsest resolution. Because of these intermediate images, a new vector $V'_t$ is found in this step 120, and in the step 130 the operations are repeated in the triplet of images having the highest resolution, enabling fast determination of a motion vector $V_t$ with this highest resolution.

Experiments have shown that the criterion AD-$SC_{DLp}$ offers very satisfactory results while utilizing a hierarchical search at the resolutions stated. Actually, if the resolution is too high, the number of calculations is enormous. On the other hand, if the images are too coarse, perhaps errors are introduced because the blocks are so coarse that the linear hypothesis no longer makes sense. However, when use is made of the stated intermediate levels, on the one hand the calculations are not very erroneous because small blocks are still involved, and on the other hand the results are significantly enhanced. This enables real time operation. The calculations have been performed by means of a signal processor C80 which will be known to those skilled in the art. Using this processor, a method AD-SC$_{DLp}$ can be carried out in real time with a utilization factor equal to 0.6 for the pyramidal search part HF-SP and a utilization factor of 0.7 for the pyramidal search part HF-SP, followed by the method AD-SC$_{DLp}$. The execution of the described method thus requires a single component C80.

Figure 8:
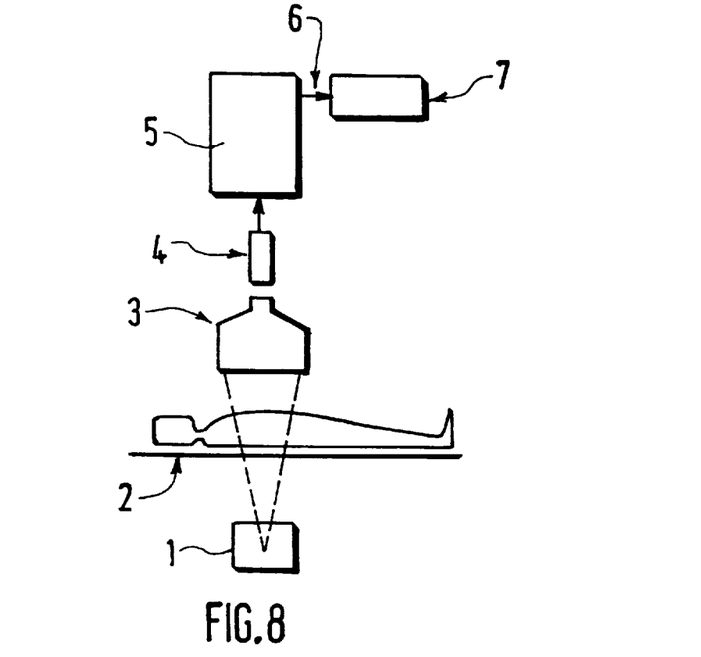
FIG. 8 shows an X-ray imaging apparatus.

Referring to FIG. 8, a digital radiography apparatus includes an X-ray source 1, a table 2 for accommodating the patient, an image intensifier device 3 which is coupled to a camera tube 4 which applies data to a digital image processing system 5 which includes a processor for carrying out the motion estimation method and a noise filtering operation utilizing this method. The processor has several outputs, an output 6 of which is coupled to a monitor 7 in order to visualize a sequence of radiographic images. Because of this image processing system, the radiology apparatus can operate in the fluoroscopy mode.

All references cited herein are incorporated herein by reference in their entirety and for all purposes to the same extent as if each individual publication or patent or patent application was specifically and individually indicated to be incorporated by reference in its entirety for all purposes.

What is claimed is:

1. An image processing method for estimation of motion in a sequence of noisy images comprising a step for determining a motion vector field from one temporal image to the next on the basis of a block matching algorithm by:

acquiring a sequence of three successive temporal images, including an image to be processed ($J_t$) between a preceding causal image ($J_{t-1}$) and a later anti-causal image ($J_{t+1}$), determining a reference block (RB$_t$) in the image to be processed, and a pair of blocks (CB$_{t-1}$, CB$_{t+1}$) which are located in the causal image and the anti-causal image, respectively, and which best match the reference block (RB$_t$) in conformity with an intensity similarity criterion, and determining a motion vector relating to the reference block on the basis of the location of the blocks of said pair with respect to the location of the reference block.

2. A method as claimed in claim 1 wherein the intensity similarity criterion is based on selecting matching blocks which are symmetrical with respect to the reference block, and determining symmetrical motion vectors from the reference block towards each of the matching blocks.

3. A method as claimed in claim 1 wherein the intensity similarity criterion is a double intensity similarity criterion which is a function of a first, elementary similarity criterion which is called the causal part and links the reference block to the matching block in the causal image, and a second elementary similarity criterion which is called the anti-causal part and links the reference block to the matching block in the anti-causal image, said causal and anti-causal parts being identical and being applied to the causal and the anti-causal image at different relative instants.

4. A method as claimed in claim 3 wherein the function for forming the double intensity similarity criterion on the basis of causal and anti-causal parts is chosen from among a sum, a mean value and a linear combination.

5. A method as claimed in claim 3 wherein the step for determining matching blocks comprises a test which is applied to the motion between the matching block in the causal image and the matching block in the anti-causal image in order to determine whether a hypothesis that this motion is linear, continuous and uniform is verified or not, and on the basis of this test a decision is taken:

if this hypothesis is verified, the motion vector is determined by the double intensity similarity criterion;

if this hypothesis is not verified, the motion vector is determined by an elementary intensity similarity criterion between the reference block and the anti-causal matching block, said test determining that said hypothesis is verified if the motion vector which optimizes the double criterion is substantially identical to a motion vector which optimizes the causal part of said double criterion.

6. A method as claimed in claim 3 wherein the elementary intensity similarity criteria are so-called Minkowski distances.

7. An image processing method as claimed in claim 1 wherein the step for determining a motion vector further comprises:

a step for forming three pyramids of images of different resolution, derived from the image to be processed, from the causal image, and from the anti-causal image, a step for determining a motion vector by application of the intensity similarity criterion to the three images of lowest resolution, derived from the image to be processed, from the causal image and from the anti-causal image, a step for relating the motion vector found at the lowest resolution in the images derived from the image to be processed, the causal image, and the anti-causal image, to the directly higher resolution, and for searching a new motion vector around the vector related to said directly higher resolution, repeating the prior step until the highest resolution is reached so as to find the motion vector searched.

8. A method as claimed in claim 1 further comprising steps for the recursive temporal filtering of the noise with motion compensation by means of said determined motion vector.

9. A medical imaging apparatus comprising:

a system for the acquisition of a sequence of images, an image processing system which has access to the data of the images and which includes a processor for carrying out an image processing method as claimed in claim 1, and a system for displaying the sequence of images.

10. An X-ray apparatus comprising:

an X-ray system for the acquisition of a sequence of images, an image processing system which has access to the data of the images and which includes a processor for carrying out an image processing method as claimed in claim 1 and a system for displaying the sequence of images.

11. A method as claimed in claim 2 wherein the intensity similarity criterion is a double intensity similarity criterion which is a function of a first, elementary similarity criterion which is called the causal part and links the reference block to the matching block in the causal image, and a second elementary similarity criterion which is called the anti-causal part and links the reference block to the matching block in the anti-causal image, said causal and anti-causal parts being identical and being applied to the causal and the anti-causal image at different relative instants.

12. A method as claimed in claim 5 wherein the elementary intensity similarity criteria are so-called Minkowski distances.

13. An image processing method as claimed in claim 2 wherein the step for determining a motion vector further comprises:
- a step for forming three pyramids of images of different resolution, derived from the image to be processed, from the causal image, and from the anti-causal image,
- a step for determining a motion vector by application of the intensity similarity criterion to the three images of lowest resolution, derived from the image to be processed, from the causal image and from the anti-causal image,
- a step for relating the motion vector found at the lowest resolution in the images derived from the image to be processed, the causal image, and the anti-causal image, to the directly higher resolution, and for searching a new motion vector around the vector related to said directly higher resolution,
- repeating the prior step until the highest resolution is reached so as to find the motion vector searched.

14. An image processing method as claimed in claim 3 wherein the step for determining a motion vector further comprises:
- a step for forming three pyramids of images of different resolution, derived from the image to be processed, from the causal image, and from the anti-causal image,
- a step for determining a motion vector by application of the intensity similarity criterion to the three images of lowest resolution, derived from the image to be processed, from the causal image and from the anti-causal image,
- a step for relating the motion vector found at the lowest resolution in the images derived from the image to be processed, the causal image, and the anti-causal image, to the directly higher resolution, and for searching a new motion vector around the vector related to said directly higher resolution,
- repeating the prior step until the highest resolution is reached so as to find the motion vector searched.

15. An image processing method as claimed in claim 5 wherein the step for determining a motion vector further comprises:
- a step for forming three pyramids of images of different resolution, derived from the image to be processed, from the causal image, and from the anti-causal image,
- a step for determining a motion vector by application of the intensity similarity criterion to the three images of lowest resolution, derived from the image to be processed, from the causal image and from the anti-causal image,
- a step for relating the motion vector found at the lowest resolution in the images derived from the image to be processed, the causal image, and the anti-causal image, to the directly higher resolution, and for searching a new motion vector around the vector related to said directly higher resolution,
- repeating the prior step until the highest resolution is reached so as to find the motion vector searched.

16. A method as claimed in claim 2 further comprising steps for the recursive temporal filtering of the noise with motion compensation by means of said determined motion vector.

17. A method as claimed in claim 3 further comprising steps for the recursive temporal filtering of the noise with motion compensation by means of said determined motion vector.

18. A method as claimed in claim 5 further comprising steps for the recursive temporal filtering of the noise with motion compensation by means of said determined motion vector.

* * * * *